Nov. 30, 1965 W. HÄNLEIN ETAL 3,220,199

THERMOELECTRIC DEVICES, AND METHOD AND APPARATUS
FOR PRODUCING THIN THERMOCOUPLE LEGS
BY EXTRUSION

Filed Feb. 20, 1962

3,220,199

THERMOELECTRIC DEVICES, AND METHOD AND APPARATUS FOR PRODUCING THIN THERMOCOUPLE LEGS BY EXTRUSION

Walter Hänlein, Erlangen, and Horst Schreiner, Nurnberg, Germany, assignors to Siemens-Schuckertwerke Aktiengesellschaft, Berlin-Siemensstadt, Germany, a corporation of Germany Filed Feb. 20, 1962, Ser. No. 174,442
Claims priority, application Germany, Feb. 23, 1961, S 72,685
25 Claims. (Cl. 62—3)

Our invention relates to the production of thermoelectric thermocouples and thermocouple components and in one of its particular though not exclusive aspects to the production of thermocouple legs for use in Peltier couples, i.e. devices for electric cooling purposes.

The operation of thermoelectric cooling devices requires the use of direct current for energizing the Peltier couples. As a rule, the direct current is derived by rectification from the generally available alternating current of utility lines. At the very small direct voltages needed for the conventional thermoelectric devices of this type, the semiconductor rectifiers most commonly employed have poor efficiency. Mechanical rectifiers for very small voltages are expensive and susceptible to trouble and for these reasons have not become available in actual practice. All rectifier devices for such low voltages are relatively expensive, and occupy appreciable space in some devices cooled electrically.

It is one of the objects of our invention, therefore, to devise a production method and equipment which results in themocouple or Peltier legs particularly suitable for use in thermoelectric columns or batteries that are capable of operating at relatively high voltage, for example such as the usual utility line voltage of 100 to 120 volts or 200 to 220 volts.

Another object of our invention is to provide an improved and more economical method of manufacturing thermocouple legs from semiconductor compounds, such as the intermetallic compounds and mixed crystals (i.e. solid solutions) thereof, that have been found particularly useful for such purposes but are brittle when cold and otherwise difficult to fabricate.

To achieve these objects and in accordance with a feature of our invention, we produce the thermocouple legs by extruding the semiconductor material while it is heated to plastic deformation temperature below its melting point, preferably slightly below, the extrusion being preferably performed by giving the extruded rod-shaped product a small cross-sectional area, below 20 square millimeters. In this manner the thermocouple legs can thereafter be severed from the extruded rod, and while in plastic condition can be given any desired cross-sectional shape without difficulty. This is in contrast to the fact that the production of thermocouple legs having such a small cross section is extremely difficult when employing a melting process or by production from pulverulent material by pressing and sintering.

The thin thermocouple legs are eminently suitable for use in Peltier cooling devices and can be used in series-connection of a number of couples so that the resulting battery can be directly energized from a high voltage, as mentioned above. However, such thin thermocouple legs are also of advantage for use in thermoelectric generators particularly for the generation of relatively high voltages and small power outputs as required, for example, for providing the anode voltage in radio equipment.

When producing the strands or rods by extruding the heated and plastically deformable semiconductor material through the extrusion die, the semiconductor material as well as the recipient of the extrusion press can be heated up to temperatures that are only slightly below the melting temperature of the semiconductor material. Particularly suitable as semiconductor material, for example, is bismuth telluride with or without doping additions. Preferably applicable are also the intermetallic compounds Pb-Te with p-type or n-type conductance, Ge-Te (p-type), Zn-Sb (p-type) or mix crystals of intermetallic compounds of the systems Ge-Bi-Te (p-type), Bi-Te-Se (n-type), Ag-Sb-Te (p-type), Ag-Sb-Ge-Te (p-type) or In-As-P (n-type), all applicable with or without doping additions, including those that invert the above-mentioned original conductance type of the material. These materials are brittle when cold but as a rule become plastically deformable when heated above the temperature of about 400° C., so that deformation and extrusion become possible without formation of cracks or fissures.

To extrude a strand of 4 mm. diameter of p-type $Sb_2Te_3Bi_2Te_3$ (70/30 mol percent), a temperature of 390° C. and a specific pressure of 9.3 t./cm.$^2$ are required. To extrude a strand of 4 mm. diameter of n-type $$Bi_2Te_3Bi_2Se_3$$

(80/20 mol percent) a temperature of 410° C. and a specific pressure of 10.0 t./cm.$^2$ are required.

When carrying out the method, the rod issuing from the extrusion die is preferably surrounded by an inert or protective gas which prevents it from oxidation. Suitable for this purpose, for example, are nitrogen or argon. The device for supplying the protective gas may comprise a tubular member surrounding the emerging rod, and the tubular member may have its lower end immersed in a vessel filled with water.

It is further preferable to facilitate the issuance of the shaped material from the extrusion die by the application of lubricants that are effective under the temperature and high extrusion pressure. Suitable as such lubricants, for example, are pastes that contain graphite or other carbon material, usually in admixture with organic substances. Applicable are also synthetic and natural waxes. We have found it particularly favorable to perform the method of the invention by using as lubricant a glass having a relatively low softening point. The glass may be added in pulverulent form. Particularly suitable for this purpose are lead-containing glasses with a PbO content between 70 and 95% whose softening temperature is within the range of about 400 and about 500° C.

According to a modified mode of our invention, the semiconductor material is extruded through a die consisting of glass or comprising a glass plate which is located above or adjoining to the glass and has an extrusion orifice through which the strand or rod passes. The glass used for this purpose is preferably a lead-containing glass with a PbO content and softening temperature as stated above. Of course, when a glass die is used, the softening temperature of the glass die must be higher than the temperature of the specific material being extruded therethrough.

It is of particular advantage to apply the above-mentioned lubricating substance by enveloping the semiconductor material prior to its extrusion with a coating of substance that has lubricating action at the high extrusion pressure. Such an envelope or coating may also consist of a sleeve into which the semiconductor material is inserted with a close fit. The coating or sleeve, forming the envelope, may consist of metal, for example aluminum, which is sufficiently deformable for this purpose. The aluminum coating, which after extrusion remains on the surface of the extruded rod, is only a few microns thick and can subsequently be eliminated mechanically by machining or chemically by etching or dissolution, in cases where this envelope serves only the purpose of facilitating the extrusion or for improving the surface properties of the extruded rod. Also suitable as an envelope is a plastically deformable non-metallic substance, particularly a semiconductor material. The envelope or sleeve may also consist of glass in which case a lead glass is preferable having the above-mentioned composition and the above-mentioned softening temperature. For cooling the rod issuing from the extrusion die, it is preferably passed through a calibrating tube attached to the die. The surface of the strand may also be provided with an oxide coating, for example a coating of aluminum oxide, in order to protect the rod from oxidation and/or corrosion and/or from evaporation of components.

The above-described method of the invention can further be modified by charging respectively different thermoelectric materials into the recipient of the extrusion press, for example in form of pills, cakes or other shaped dosages of material so that the resulting continuous rod produced by extrusion has a sequence of thermoelectrically different portions along its length. For example, the different charges placed into the extrusion press may all have the same type of conductance but may have different temperature working ranges, as described in the copending application referred to below. In this case the different longitudinally sequential portions of the extruded rod have respectively different thermoelectric properties at different temperatures. The resulting products are similar to the stratified thermocouple legs described and illustrated in the copending application of H. Schreiner, Serial No. 81,409, filed January 9, 1961, and assigned to the assignee of the present invention. The materials and sequences of material described in the said copending application are also applicable for the purposes of the present invention.

However, the different charges placed into the extrusion press may also consist of materials having alternately p-type and n-type conductance respectively, in which case alternating portions of the extruded rod have alternating type of conductance.

As mentioned, the resulting rod-shaped product is usually cut into pieces of a given length, each constituting a single leg for a thermocouple. However, the emerging rod, when still in plastic condition, may also be bent to curved, reverse bend, sinuous or hair-pin shape. In this manner, a curved thermocouple device can be produced, and this device comprises leg portions of respectively different conductance type if the method is performed, in the above-described manner, by introducing alternately n-type and p-type charges into the extrusion press. The rod then comprises one or more complete thermocouples rather than individual legs.

All above-described operations during extrusion of the semiconductor material can be performed with a simultaneous application of mechanical oscillations, preferably ultrasonic vibrations.

By means of the above-described method of the invention, thin thermocouples or legs can be produced without difficulty, such legs or couples being of advantage in various thermoelectric devices. The p-type and n-type legs of current-traversed thermocouples, built into devices for cooling or heating purposes, can be electrically connected in series and can be given such a dimensioning and can be of such a number (about four hundred legs) that they can be directly connected to a utility line or conventional power distribution line. For example, such devices are suitable for direct connection to a direct-current line, or they can be connected via rectifiers to an alternating-current line and the rectifiers in this case are preferably rated for the line voltage rather than requiring the interposition of a transformer.

The invention will be further elucidated with reference to the extrusion apparatus and details shown by way of example on the accompanying drawing in which.

Figures 1, 2, 3, 4A, 4B, 5:
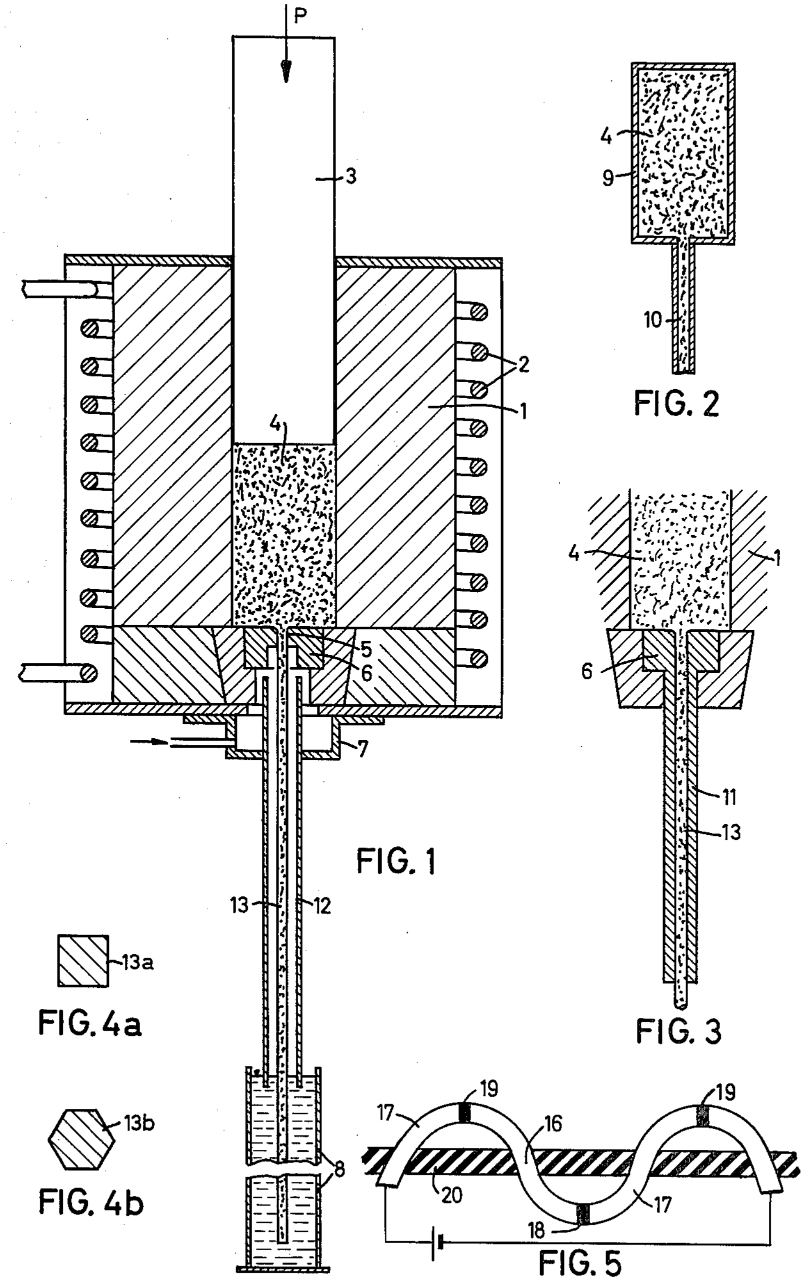
FIG. 1 is an axial section through an extrusion press modified for the purposes of the invention.
FIG. 2 is a schematic sectional view of a semi-conductor charge enveloped in a sleeve.
FIG. 3 shows a modification of the die and nozzle portion of the extrusion press.
FIGS. 4*a*, 4*b* show cross-sectional shapes of the extruded rod.
FIG. 5 is a portion of a thermoelectric cooling apparatus.

The pressure cylinder or receiver 1, consisting of steel or other suitable metal, is provided with an electric heater coil 2 which heats the recipient space in the cylinder to a temperature of 450 to 500° C. The semiconductor material 4 is charged into the interior of the receiver. This material may consist of a body pre-shaped by pressing from pulverulent material or it may consist or a sintered body. Suitable for the purposes of the invention are the above-mentioned semiconductor materials, for example bismuth telluride with or without doping, or Sb-Bi-Te or Bi-Te-Se. After the semiconductor material is charged into cylinder 1, and after the necessary heating period required for the material to reach a temperature between 450 and 500° C., the charge is loaded by means of a plunger 3 and the pressure, indicated in FIG. 1 by an arrow *p*, is gradually increased until the thermoelectric material emerges through the extrusion orifice 5 of the die 6 of low-softening point glass, preferably. The rate of emergence is controlled by varying the pressure but can also be controlled by varying the speed of the plunger travel. For protecting the rod against oxidation when it emerges from the die still in hot condition, the outlet area of the die is kept rinsed with protective gas such as nitrogen. For this purpose the outlet is enclosed by structure comprising a housing 7 which is supplied with the protective gas, and a tube 12 coaxially surrounding the emerging semiconductor rod 13 with ample clearance and terminating downwardly in water 8, thus also cooling the strand.

To prevent cracking at the surface of the rod, the semiconductor material 4 can be enveloped in a closed metal sleeve 9, as shown in FIG. 2. The inner space is preferably evacuated by means of an extension tube 10 and is thereafter air-tightly sealed. The charge, thus prepared, is then inserted into the interior of the receiver 1 and the extrusion performed in the same manner as described with reference to FIG. 1. The emerging rod then retains a thin coating, for example of aluminum, stemming from the material of the sleeve 9. The sleeve material acts as a high-pressure lubricant in the orifice 5 of the die 6 during extrusion. Also suitable for the same purposes are sleeves or envelopes that are closed at only one axial end. Aside from metal sleeves, open or closed sleeves or envelopes of semiconductor material, plastic, or glass are also applicable as explained above.

FIG. 3 shows a modified design of the die 6 specially suitable for reliably preventing the formation of cracks in the rod. The die 6 merges with or is integral with a calibrating tube 11 whose diameter in cross section corresponds to that of the orifice, so that the semiconductor rod 13, after being forced into the die, does not immediately emerge into the protective gas atmosphere but passes through the calibrating tube 11 over a considerable distance. The length of tube 11, for otherwise given conditions, determines the temperature of the rod 13 at the point where it issues from the tube 11.

The leg or rod 13 may have a circular cross section but, as mentioned, has preferably a cross-sectional area less than 20 $mm.^2$. Other cross-sectional shapes **13*a*, 13*b* of the rod, and hence of the extrusion orifice 5 in the die 6**, are shown in FIGS. 4*a* and 4*b*, the orifice 5 according to FIG. 4*a* being square and that according to FIG. 4*b* being a regular hexagon.

Examples 1 to 4 of the said copending application of H. Schreiner, Serial No. 81,409 of 1961, describe n-type and p-type legs formed of semiconductor materials employable here. The drawing of said application shows arrangements of thermoelectric batteries and thermoelectric Peltier cooling devices applicable here.

The leg can be curved into any desired required shape, as it leaves the extrusion die and while still in hot and plastic condition. Such shape may be that of a U, or hairpin, or it may be a single reverse bend. A thermopile can be formed by joining, fusing or placing together ends of such reverse bends to form a sinuous outline, the joints or junctions being offset laterally from the center axial line of the sinuous outline, the cold junctions alternating with the hot junctions, the cold junctions being on one side, and the hot junctions on the other. Such reverse bends can also be used to make a Peltier cooling device, by inserting copper bars between the ends of the reverse bends.

FIG. 5 shows a portion of a thermoelectric cooling apparatus assembled of legs 16 and 17, bent in a sinuous shape. The legs are inserted in a thermally and electrically insulating wall 20 and joined at the points 18 and 19, if desired with the use of copper bars or fins. Direct current supply means are connected to the legs to directly supply voltages of at least about 100 volts across the series of alternating hot and cold junctions.

The term "semiconductor material" as used herein is to be understood to be materials with p-type or n-type conductivity, and as defined in the book Thermoelectricity by Heikes and Ure (Westinghouse), 1961, Chapter 3, pp. 19 et seq.

To those skilled in the art, it will be obvious, upon a study of this disclosure, that our invention permits of various modifications with respect to materials and equipment and hence may be given embodiments other than particularly illustrated and described herein, without departing from the essential features of our invention and within the scope of the claims annexed hereto.

We claim:

1. In the method of producing a thermocouple device, the steps of forming at least one of the legs thereof by heating a thermoelectric semiconductor material comprising an intermetallic compound to plastic deformation temperature below its melting point and pressing it in heated plastic condition through an extrusion orifice into the shape of a thin rod of less than 20 mm.$^2$ cross section, applying lubricant to be effective in the extrusion, and shielding the rod where it emerges from the extrusion orifice from access of oxygen by passing the emerging rod directly from said orifice into a calibrating tube having a cross section corresponding to that of said orifice, and conducting said rod through said tube for a relatively considerable distance so as to avoid cracking of the rod.

2. The method of claim 1, including the step of bending the emerging rod to curved shape while still in hot and plastic condition.

3. The method of claim 1 wherein the lubricant is carbonaceous substance from the group consisting of carbon pastes, and synthetic and natural waxes.

4. The method of claim 1 wherein the lubricant consists essentially of glass having a softening temperature of about 400 to about 500° C.

5. The method of claim 1 wherein the lubricant consists essentially of glass having a softening temperature of about 400 to about 500° C. and having a PbO content of about 70 to about 95%.

6. In the method of producing a thermocouple device, the steps of forming at least one of the legs thereof by heating a thermoelectric semiconductor material to plastic deformation temperature below the melting point, and extruding a rod of the heated plastic material through an orifice in a glass die and passing the emerging rod directly from said orifice into a calibrating tube having a cross section corresponding to that of said orifice, and conducting said rod through said tube for a relatively considerable distance so as to avoid cracking of the rod.

7. In the method of claim 6, said glass consisting of lead glass having a PbO content between 70 and 95%.

8. In the method of producing a thermocouple device, the steps of forming at least one of the legs thereof by enveloping a thermoelectric semiconductor material in high-pressure lubricating substance, heating the semiconductor material in the enveloping material to plastic deformation temperature below its melting point, extruding the hot semiconductor material through an orifice under a pressure at which said substance has lubricating action in the extrusion, and thereby forming a thin semiconductor rod, passing the emerging rod directly from said orifice into a calibrating tube having a cross section corresponding to that of said orifice, and conducting said rod through said tube for a relatively considerable distance so as to avoid cracking of the rod.

9. The method of claim 8, said enveloping material being a metal plastically deformable at the extrusion temperature.

10. The method of claim 8, said enveloping material being a plastically deformable non-metallic substance.

11. The method of claim 8, said enveloping material consisting essentially of glass having a softening temperature of about 400 to about 500° C.

12. In the method of producing a thermocouple device, the steps of forming at least one leg thereof by heating thermoelectric semiconductor material to plastic deformation temperature and pressing it in hot plastic condition through an extrusion orifice into the shape of a thin rod of not more than 20 mm.$^2$ cross-sectional area, and passing the emerging rod through an elongated calibrating passage immediately adjacent to the orifice to prevent cracking of said rod, said passage having a cross section corresponding to that of said orifice.

13. The method of producing thermocouple legs, which comprises charging respective thermoelectrically different semiconductor materials to an extrusion means in alternating sequence, heating the materials to plastic deformation temperature below the melting point, extruding the plastic materials under pressure to the shape of a rod of not more than twenty square millimeters cross section, thereby producing a rod with alternate portions of different thermoelectric properties.

14. The method according to claim 1, including the step of applying ultrasonic vibration during extrusion of the rod.

15. The method of producing a thermoelectric device, comprising charging semiconductor materials having p-type and n-type conductances respectively to an extrusion means in alternating sequence, heating the materials to plastic deformation temperature below the melting point, extruding the plastic materials under pressure to the shape of a rod, and thereby producing a rod with alternating portions having alternating type conductance, the rod thus comprising at least one complete thermocouple.

16. The method of producing a thermoelectric device, comprising charging semiconductor materials having p-type and n-type conductances respectively to an extrusion means in alternating sequence, heating the materials to plastic deformation temperature below the melting point, extruding the plastic materials under pressure to the shape of a rod, and thereby producing a rod with alternating portions having alternating type conductance, the rod thus comprising at least one complete thermocouple, and bending the emerging rod while in hot, plastic condition at localities spaced lengthwise of the rod and located so as to form alternating hot and cold junctions which are laterally offset from each other, the hot junctions being on one side, and the cold junctions on the other.

17. The method defined in claim 16, the extruded rod having a cross-sectional area below twenty square millimeters.

18. A thermoelectric device comprising an integral extruded rod having series-connected alternating p-type and n-type semiconductor sections joined directly to each other to provide a series of alternating hot and cold junctions, the rod having a cross-sectional area not more than about twenty square millimeters, the rod having bends at localities spaced lengthwise thereof and located so that said hot and cold junctions are laterally offset from each other, the hot junctions being on one side and the cold junctions on the other.

19. A thermoelectric cooling system comprising an elongated semiconductor rod-shaped device having extruded alternating p-type and n-type semiconductor sections providing a series of a plurality of alternating hot and cold junctions, the rod-shaped device having a cross-sectional area not more than about twenty square millimeters, direct-current supply means connected to directly apply voltages of at least about 100 volts across said series.

20. The apparatus of claim 19, the sections each being in the form of a reverse bend and disposed in relation to each other to form a wave-shaped structure, and so that the hot and cold junctions are laterally offset from each other, the hot junctions being on one side and the cold junctions on the other.

21. The system defined in claim 19, there being heat-conductive metal bars disposed between each section, the semiconductor sections comprising extruded bodies of semiconductor particles bonded together by heat plasticization below the melting point of some of the particles.

22. A thermoelectric device having a quantity of about 400 extruded thermoelectric legs each of a cross section dimension less than 20 mm.$^2$, said legs comprising p-type and n-type semiconductors electrically series-connected, said dimension and said quantity being such that said legs can be directly connected to a direct current conventional low voltage utility power line.

23. The method of extruding p-type and n-type thermoelectric semiconductor materials into relatively thin rods, which comprises the steps of heating a semiconductor material comprising an intermetallic compound to plastic deformation temperature below its melting point, pressing it in heated plastic condition through an extrusion orifice into the shape of a thin rod, applying lubricant to be effective in the extrusion, and shielding the rod from access of oxygen where said rod emerges from the extrusion step by passing the emerging rod directly from said orifice into a calibrating tube having a cross section corresponding to that of said orifice, and conducting said rod through said tube of a relatively considerable distance so as to avoid cracking of the rod.

24. The method according to claim 23, said semiconductor materials being at least one material selected from the group consisting of bismuth telluride, the intermetallic compounds Pb-Te with p-type conductance, Pb-Te with n-type conductance, Ge-Te (p-type), Zn-Sb (p-type), mix crystals of intermetallic compounds of the systems Ge-Bi-Te (p-type), Bi-Te-Se (n-type), Ag-Sb-Te (p-type) Ag-Sb-Ge-Te (p-type), In-As-P (n-type), and the foregoing semiconductor materials with and without dropping additions including additions which invert the aforementioned original conductance type of the material.

25. A thermoelectric device comprising an integral extruded rod having series-connected alternating sections of p-type and n-type semiconductor materials joined directly to each other, said semiconductor materials being selected from the group consisting of bismuth telluride, the intermetallic compounds Pb-Te with p-type conductance, Pb-Te with n-type conductance, Ge-Te (p-type), Zn-Sb (p-type), mix crystals of intermetallic compounds of the systems Ge-Bi-Te (p-type) Bi-Te-Se (n-type), Ag-Sb-Te (p-type), Ag-Sb-Ge-Te (p-type), In-As-P (n-type), and the foregoing semiconductor materials with and without dropping additions including additions which invert the aforementioned original conductance type of the material.

References Cited by the Examiner

UNITED STATES PATENTS

| | | | |
|---|---|---|---|
| 1,739,620 | 12/1929 | Summey | 207—10.11 X |
| 2,123,416 | 7/1938 | Graham | 207—103 X |
| 2,225,424 | 12/1940 | Schwarzkopf | 29—420.5 X |
| 2,402,663 | 6/1946 | Ohl. | |
| 2,740,874 | 4/1956 | Kelly et al. | 29—155.63 X |
| 2,783,499 | 3/1957 | Billen | 207—103 X |
| 2,794,241 | 6/1957 | Dodds et al. | 29—420.5 |
| 2,844,638 | 7/1958 | Lindenblad | 62—3 |
| 2,893,554 | 7/1959 | Sejournet et al. | 207—10.1 |
| 2,937,354 | 5/1960 | Mazzarella et al. | 29—155.5 X |
| 2,992,539 | 7/1961 | Curtis | 62—3 |
| 3,002,614 | 10/1961 | Jones. | |
| 3,010,196 | 11/1961 | Smith et al. | 29—420.5 |
| 3,016,715 | 1/1962 | Pietsch | 136—4.2 X |
| 3,051,767 | 8/1962 | Frederick et al. | 136—5 |

FOREIGN PATENTS

| | | |
|---|---|---|
| 689,051 | 3/1953 | Great Britain. |

OTHER REFERENCES

A.S.M.E. "Friction and Lubrication at Temperatures to 1000° F. . ." Bisson et al., Oct. 8, 1957, p. 10 and 12 relied on.

Metalworking Lubricants, Bastian, McGraw-Hill Book Co., 1951, pp. 13 and 15.

WILLIAM J. WYE, *Primary Examiner.*

ROBERT A .O'LEARY, *Examiner.*